(12) United States Patent
Perry et al.

(10) Patent No.: US 9,703,537 B2
(45) Date of Patent: *Jul. 11, 2017

(54) METHOD FOR DEFINING ALIAS SETS

(71) Applicant: International Business Machines Corporation, Armonk, NY (US)

(72) Inventors: Sean D. Perry, Ontario (CA); David Tremaine, Ontario (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/929,448

(22) Filed: Nov. 2, 2015

(65) Prior Publication Data

US 2017/0123772 A1    May 4, 2017

(51) Int. Cl.
*G06F 9/45* (2006.01)
(52) U.S. Cl.
CPC .............. *G06F 8/434* (2013.01); *G06F 8/443* (2013.01)
(58) Field of Classification Search
CPC ...................................................... G06F 8/434
USPC ........................................................ 717/157
See application file for complete search history.

(56) References Cited

U.S. PATENT DOCUMENTS

| | | | | |
|---|---|---|---|---|
| 5,535,394 A * | 7/1996 | Burke | ...................... | G06F 8/434 717/144 |
| 5,896,537 A * | 4/1999 | Landi | ...................... | G06F 8/434 717/132 |
| 6,026,241 A * | 2/2000 | Chow | ...................... | G06F 8/443 717/152 |
| 6,045,585 A * | 4/2000 | Blainey | ...................... | G06F 8/41 717/156 |
| 6,128,775 A * | 10/2000 | Chow | ...................... | G06F 8/443 717/156 |
| 6,173,444 B1 * | 1/2001 | Archambault | .......... | G06F 8/434 717/145 |
| 6,202,202 B1 * | 3/2001 | Steensgaard | ............ | G06F 8/437 717/127 |
| 6,317,134 B1 * | 11/2001 | Hagemark | ............... | G01B 3/56 345/542 |
| 6,457,023 B1 * | 9/2002 | Pinter | ...................... | G06F 8/434 |
| 6,665,865 B1 * | 12/2003 | Ruf | ......................... | G06F 8/443 717/144 |
| 6,668,325 B1 * | 12/2003 | Collberg | ................. | G06F 21/14 713/194 |
| 6,970,985 B2 * | 11/2005 | Moritz | .................. | G06F 8/4432 711/137 |
| 7,058,561 B1 * | 6/2006 | Kumar | ...................... | G06F 8/49 703/22 |
| 7,089,537 B2 | 8/2006 | Das et al. | | |

(Continued)

OTHER PUBLICATIONS

Demand-Driven Context-Sensitive Alias Analysis for Java—Dacong Yan, Guoqing Xu, Atanas Rountev-Ohio State University; ISSTA '11, Jul. 17-21, 2011, Toronto, ON, Canada.*

(Continued)

*Primary Examiner* — Francisco Aponte
(74) *Attorney, Agent, or Firm* — Adolph C. Bohnstedt

(57) ABSTRACT

One or more processors determine whether a first procedure within a first program meets a first criterion. The first criterion is included in a plurality of criteria that are configured for pessimistic aliasing. Responsive to the determination, one or more processors determine whether to flag the first procedure for pessimistic aliasing.

10 Claims, 4 Drawing Sheets

(56) References Cited

U.S. PATENT DOCUMENTS

| | | | |
|---|---|---|---|
| 7,111,294 B2* | 9/2006 | Steensgaard | G06F 12/0269 711/100 |
| 7,444,626 B2* | 10/2008 | McIntosh | G06F 8/4435 717/151 |
| 7,493,607 B2* | 2/2009 | Moritz | G06F 8/4432 711/129 |
| 7,581,213 B2* | 8/2009 | Peri | G06F 8/434 717/144 |
| 7,856,627 B2* | 12/2010 | Archambault | G06F 8/443 717/151 |
| 8,015,556 B2* | 9/2011 | Cui | G06F 12/0253 717/143 |
| 8,056,066 B2* | 11/2011 | Chan | G06F 8/434 717/155 |
| 8,122,442 B2 | 2/2012 | Lin | |
| 8,141,049 B2 | 3/2012 | Kahlon | |
| 8,284,206 B2* | 10/2012 | State | G06F 9/4881 345/502 |
| 8,549,504 B2* | 10/2013 | Breternitz, Jr. | G06F 9/30072 717/153 |
| 8,589,888 B2 | 11/2013 | Cui et al. | |
| 8,689,180 B2* | 4/2014 | Chandra | G06F 8/433 712/227 |
| 8,789,032 B1* | 7/2014 | Li | G06F 8/4443 717/151 |
| 8,793,675 B2* | 7/2014 | Lin | G06F 8/456 717/150 |
| 8,806,463 B1* | 8/2014 | Li | G06F 8/4443 717/151 |
| 8,839,218 B2* | 9/2014 | Bowler | G06F 8/443 717/158 |
| 8,869,127 B2* | 10/2014 | Dolby | G06F 8/72 717/150 |
| 8,910,135 B2* | 12/2014 | Lai | G06F 8/4442 717/152 |
| 8,930,927 B2* | 1/2015 | Bowler | G06F 8/434 717/140 |
| 8,972,372 B2* | 3/2015 | Elbaum | G06F 17/30864 707/706 |
| 9,019,283 B2* | 4/2015 | State | G06F 9/4881 345/502 |
| 9,104,577 B2* | 8/2015 | Barton | G06F 12/0837 |
| 9,235,393 B2* | 1/2016 | Moritz | G06F 8/4432 |
| 9,298,630 B2* | 3/2016 | Barton | G06F 12/0837 |
| 2006/0090063 A1* | 4/2006 | Theis | G06F 8/4451 712/239 |
| 2009/0037690 A1* | 2/2009 | Busck | G06F 8/434 711/221 |
| 2010/0162219 A1* | 6/2010 | Bowler | G06F 11/366 717/154 |
| 2012/0079245 A1* | 3/2012 | Wang | G06F 9/30072 712/208 |
| 2013/0007385 A1 | 1/2013 | Das et al. | |
| 2015/0169305 A1* | 6/2015 | State | G06F 9/4881 345/420 |

OTHER PUBLICATIONS

On-the-fly Detection of Precise Loop Nests Across Procedures on a Dynamic Binary Translation System-Yukinori Sato,Yasushi Inoguchi—Center for Information Science,Japan Advanced Institute ofScience and Technology—Tadao Nakamura Department of Information andComputer Science Keio University Yokohama, Japan-CF'11, May 3-5, 2011, Ischia, Italy.*

Speculative Alias Analysis for Executable Code-Manel Fernandez and Roger Espasa—Computer Architecture Department Universitat Politò ecnica de Catalunya C/ Jordi Girona 1-3, 08034 Barcelona, Spain—Proceedings of the 2002 International Conference on Parallel Architectures and Compilation Techniques (PACT'02)-2002 IEEE.*

Compiler Construction of Idempotent Regions and Applications in Architecture Design by Marc A. de Kruijf, A dissertation submitted in partial fulfillment of the requirements for the degree of Doctor of Philosophy (Computer Sciences) at the University of Wisconsin—Madison 2012.*

Introduction to Parallel Programming Concepts, Alan Scheinine, IT Consultant High Performance Computing Center for Computational Technology and Information Technology Services Louisiana State University-2009.*

Alias Analysis by Means of a Model Checker-Vincenzo Martena and Pierluigi San Pietro, Dipartimento di Elettronica e Informazione, Politecnico di Milano,P.za Leonardo da Vinci, 32. Milano 20133, Italia-Work partially supported by STMicroelectronics and by CNR-CESTIA.-R. Wilhelm (Ed.): CC 2001, LNCS 2027, pp. 3-19, 2001.*

Ultra-fast Aliasin9 Analysis using CLA: A Million Lines of C Code in a Second-Nevin Heintze,Research, Agere Systems-Olivier Tardieu, Ecole des Mines, Paris-PLDI 2001 6/01 Snowbird, Utah, USA-2001 ACM ISBN 1-58113-414-Feb. 1, 2006.*

Gorbovitski et al., "Alias Analysis for Optimization of Dynamic Languages", DLS 2010, Oct. 18, 2010, Reno/Tahoe, Nevada, USA, Copyright © 2010 ACM, pp. 27-41.

Sridharan et al., "Alias Analysis for Object-Oriented Programs", Clarke et al. (Eds.): Aliasing in Object-Oriented Programming, LNCS 7850, pp. 196-225, 2013, © Springer-Verlag Berlin Heidelberg 2013, DOI 10.1007/978-3-642-36946-9.

Appendix P. List of IBM Patents or Applications Treated as Related Dated Jan. 10, 2017.

Original U.S. Appl. No. 15/187,937, filed Jun. 21, 2016.

* cited by examiner

METHOD FOR DEFINING ALIAS SETS

BACKGROUND OF THE INVENTION

The present invention relates generally to the field of computer program optimization, and more particularly to defining alias sets for procedures that can access variables declared outside of the procedure scope.

An alias occurs when different variables point directly or indirectly to a single area of storage. An alias set is a set of aliases created during aliasing. Aliasing refers to assumptions made during program optimization about which variables can point to or occupy the same storage area.

SUMMARY

Embodiments of the present invention provide a method, system, and program product to define alias sets. One or more processors determine whether a first procedure within a first program meets a first criterion, wherein the first criterion is included in a plurality of criteria that are configured for pessimistic aliasing. Responsive to the determination, one or more processors determine whether to flag the first procedure for pessimistic aliasing.

DETAILED DESCRIPTION

Figure 1:
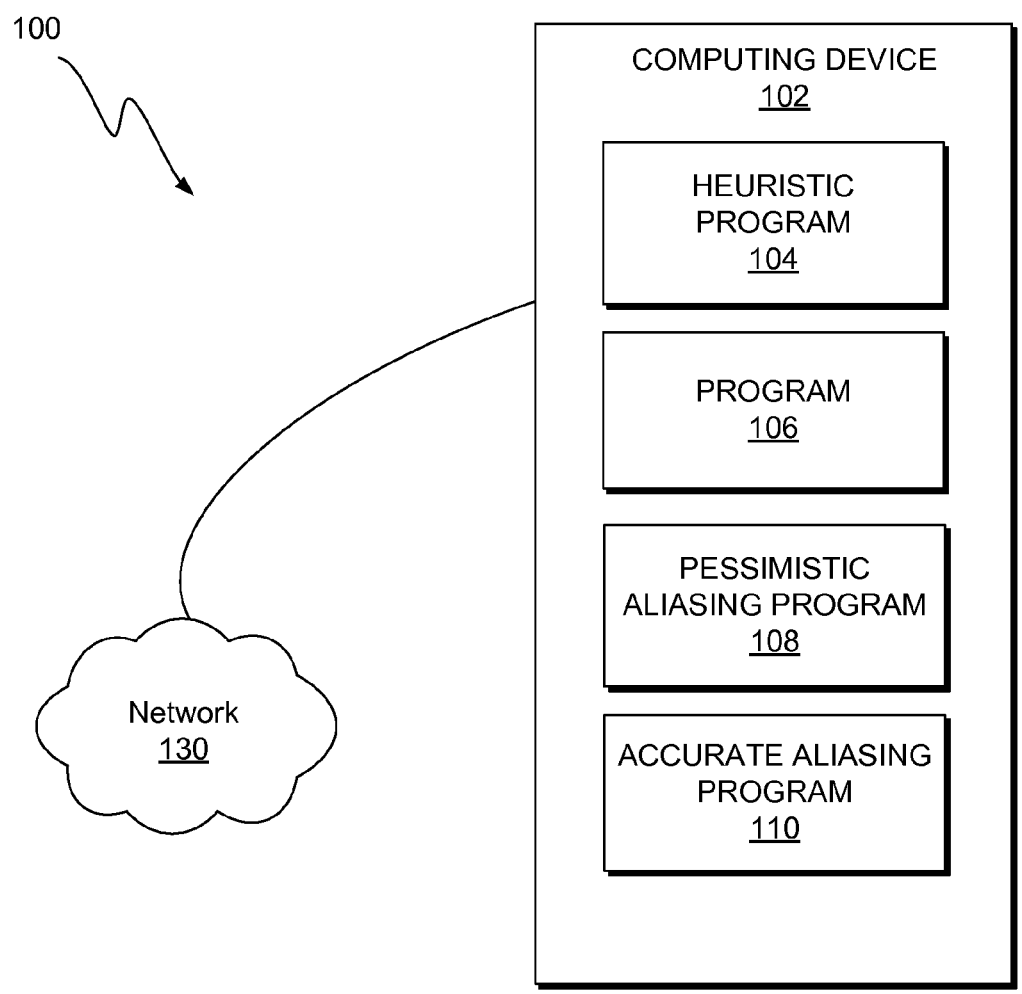
FIG. 1 is a functional block diagram illustrating a computing environment, in accordance with an exemplary embodiment of the present invention.

In computer programming, a procedure is a collection of executable statements that form a subroutine of a program. When a first procedure invokes or calls a second procedure, it is often the case that a variable is accessed that is not local to the first procedure. In other words, the first procedure has accessed a variable that was declared outside the scope of the first procedure. Examples of procedures that access variables outside of procedure scope include nested procedures (i.e., procedures declared within other procedures), methods in object-oriented (OO) languages, 'C' functions that can access file scope variables, etc. For reasons of simplicity, the term "nested procedure" will be used hereafter to refer to any procedure that has access to one or more variables declared outside the scope of the procedure.

In the context of an optimizing compiler, an alias set for a procedure is a set of variables within a program that can be referenced and/or modified by a call to the procedure. A call to a procedure "kills" the variables in the procedure alias set. In compiler terminology, a variable value is killed when the variable cannot be retained in registers across procedure call boundaries because it is assumed that the call to the procedure resulted in a modification of the values, i.e. the register data has become "stale." When a variable value is not retained in the registers, the next time the variable is referenced it must be reloaded from the computer memory to get the latest value. Reloading variable values from the computer memory as opposed to reading the value directly from a register results in decreased runtime performance. The more variables within a program that are reloaded from memory as opposed to being read from the registers, the worse the runtime performance for the program.

Successful optimization of a program requires the computation of alias sets for all procedures within the program. The computation of alias sets is often referred to as "aliasing." Aliasing nested procedures frequently results in the generation of "pessimistic" alias sets. A pessimistic alias set for a procedure includes many variables that are not actually affected by a call to that procedure. Thus, procedures that have pessimistic alias sets decrease runtime performance more than procedures that have accurately computed alias sets (i.e., alias sets that accurately reflect the set of variables that are truly affected by a call to the procedure).

Despite the negative runtime performance implications, computing pessimistic aliasing sets for nested procedures is often done because it is computationally simpler than computing accurate alias sets. In the case of programs containing nested procedures, computing accurate alias sets to improve runtime performance is not done because nested procedures often call many other nested procedures and external procedures. In addition, nested procedures often dereference many pointer variables. These characteristics lead to the expectation that computing accurate alias sets for nested procedures is not desirable because: 1) it will be expensive to do so; and 2) a very large alias set will be generated anyway, which will still lead to poor runtime performance.

Embodiments of the present invention recognize that generating a pessimistic alias set is preferable for nested procedures that are very likely to be aliased with many program variables. Embodiments of the present invention recognize that generating an accurate alias set is preferable for nested procedures that are very likely to be aliased with a small number of program variables. Embodiments of the present invention provide a method, system, and computer program product to predict whether nested procedures are likely to be aliased with many program variables. Embodiments of the present invention provide a method, system, and computer program product to predict whether nested procedures are good candidates for computationally demanding accurate aliasing or whether such procedures should undergo pessimistic aliasing.

The present invention will now be described in detail with reference to the Figures.

FIG. 1 is a functional block diagram illustrating a computing environment, generally designated 100, in accordance with one embodiment of the present invention. Computing environment 100 includes computing device 102 connected over network 130. Computing device 102 includes heuristic program 104, program 106, pessimistic aliasing program 108, and accurate aliasing program 110.

In various embodiments of the present invention, computing device 102 is a computing device that can be a standalone device, a server, a laptop computer, a tablet computer, a netbook computer, a personal computer (PC), or a desktop computer. In another embodiment, computing device 102 represents a computing system utilizing clustered computers and components to act as a single pool of seamless resources. In general, computing device 102 can be any computing device or a combination of devices with access to heuristic program 104, program 106, pessimistic aliasing program 108, and accurate aliasing program 110 and is capable of executing these programs. Computing device 102 may include internal and external hardware components, as depicted and described in further detail with respect to FIG. 4.

In this exemplary embodiment, heuristic program 104, program 106, pessimistic aliasing program 108, and accurate aliasing program 110 are stored on computing device 102. However, in other embodiments, heuristic program 104, program 106, pessimistic aliasing program 108, and accurate aliasing program 110 may be stored externally and accessed through a communication network, such as network 130. Network 130 can be, for example, a local area network (LAN), a wide area network (WAN) such as the Internet, or a combination of the two, and may include wired, wireless, fiber optic or any other connection known in the art. In general, network 130 can be any combination of connections and protocols that will support communications between computing device 102, heuristic program 104, program 106, pessimistic aliasing program 108, and accurate aliasing program 110, in accordance with a desired embodiment of the present invention.

In exemplary embodiments, heuristic program 104 analyzes nested procedures within program 106 that are able to access variables declared outside of the scope of the procedure. Heuristic program 104 determines the likelihood that variables within the procedures contained in program 106 are aliased with too many program variables to make the generation of an accurate alias set worthwhile. Heuristic program 104 determines whether aliasing the procedures within program 106 should be conducted with pessimistic aliasing program 108 or accurate aliasing program 110.

In exemplary embodiments, program 106 is any program written in a computer language that allows procedures within program 106 to be able to access variables declared outside of the scope of the procedure. Examples of computer languages that allow such situations in the form of nested procedures include common business-oriented language (COBOL), Programming Language One (PL/I), and to some extent the C programming language (C) (i.e., the GNU Compiler Collection (GCC), which supports nested procedures as a language extension of C).

In addition to programs written in computer languages that allow truly nested procedures, program 106 represents programs that support language constructs that allow functions to access variables declared outside the function scope. Examples of such languages include object-oriented (OO) languages where class methods have access to class member variables. Other examples include languages like C where functions in a module have access to static variables declared in the module (called file scope variables). Program 106 also includes programs written in OO languages such as Java, which have small subroutines called methods that can access class member variables.

In exemplary embodiments, pessimistic aliasing program 108 assigns the same aliasing information to all procedures that can access variables declared outside of their scope. Pessimistic aliasing program 108 assumes that all variables in the program that are accessed in at least one such procedure are killed by a call to any such procedure.

If:
P is a set of all procedures in a program;
V is a set of all variables declared in the program (this includes variables declared local to a procedure);

scope: P→N is a function that maps a procedure to a natural number indicating its nesting level. For a procedure p that is not nested within another procedure, scope(p)=1. If a procedure p is declared inside a procedure q where scope(q)=1, then scope(p)=2, and so on and so forth;

scope: V→N is a function that maps a variable in V to a natural number indicating the scope in which it is declared. For a variable v that is declared in the module outside the scope of any procedure (e.g., a file static variable in 'C'), scope(v)=0. If v is declared in a procedure p, then scope(v)=scope(p);

UsedInNestedProcs={v∈V|v is referenced and/or set in p∈P and scope(v)<scope(p).} These are variables that are referenced and/or set in a procedure but are declared in a containing scope;

External={v∈V|v is an external variable and is accessible outside the current compilation unit.}; and AddrTaken={v∈V|v has had its address taken.}.

Then one way of defining a pessimistic alias set of variables (AliasNestedProcs) within procedures in a program is as follows:

$$AliasNestedProcs=UsedInNestedProcs \cup External \cup AddrTaken$$

In exemplary embodiments, accurate aliasing program 110 defines alias sets specific to each procedure based on analysis of the specific variables and procedures that the procedure can access. In various embodiments, a call graph (G) is constructed for this analysis as follows:

$$G=(V,E)$$

Where:
G is a directed graph with vertices V and edges E;
V=P (i.e., the set of procedures in the program serve as the vertices of the graph);
E=(p, q); where p, q∈P and p directly calls q; and
UsedInNestedProc_{p}={v∈V|v is referenced and/or set inside p ∈ P (or q ∈ P that is reachable from p in G) and scope(v)<scope(p) (or scope(v)<scope(q)).}.

The accurate alias sets for nested procedures p can now be defined as follows:

Alias_{p}=UsedInNestedProc_{p}; (if neither p nor any other procedures reachable from p in G can make external calls); or Alias_{p}=UsedInNestedProc_{p}∪External∪AddrTaken; (if p or some procedure reachable from p in G can make external calls).

It should be understood that: 1) the variables in the alias sets computed above are likely in practice to have aliases themselves, which may be calculated via any kind of aliasing method known in the literature (e.g., aliasing based on analyzing the flow of the program, static aliasing methods that may decide aliasing for individual variables based on type (such as ANSI aliasing in the 'C' language), etc.); and 2) in practice the alias sets for the nested procedures may contain various procedure symbols in order to make the alias sets reflexive and symmetric.

Typically, for a nested procedure it is more costly to compute an accurate alias set as shown above compared to a pessimistic alias set. An accurate alias set requires the creation of a call graph, computation of a reachability relationship, and aliasing is done at an individual procedure level. The computation of an accurate alias set also results in higher memory requirements during compilation of large or complex programs. This is due, at least in part, to the fact that there is no common alias set computed for all procedures that can access variables declared outside of their scope such as is seen with a pessimistic alias set. In addition, if a procedure in a non-large, non-complex program both calls an external function or performs many pointer dereference operations and is called by many other procedures in the program, then many procedures within the program will likely be aliased with many program variables and the cost of generating an accurate alias set will be prohibitive.

In some scenarios and embodiments, one benefit of an accurate alias set is that the aliasing can be more accurate for each procedure and, in some cases, can increase the opportunity for maintaining data in registers across procedure call boundaries.

Figure 2:
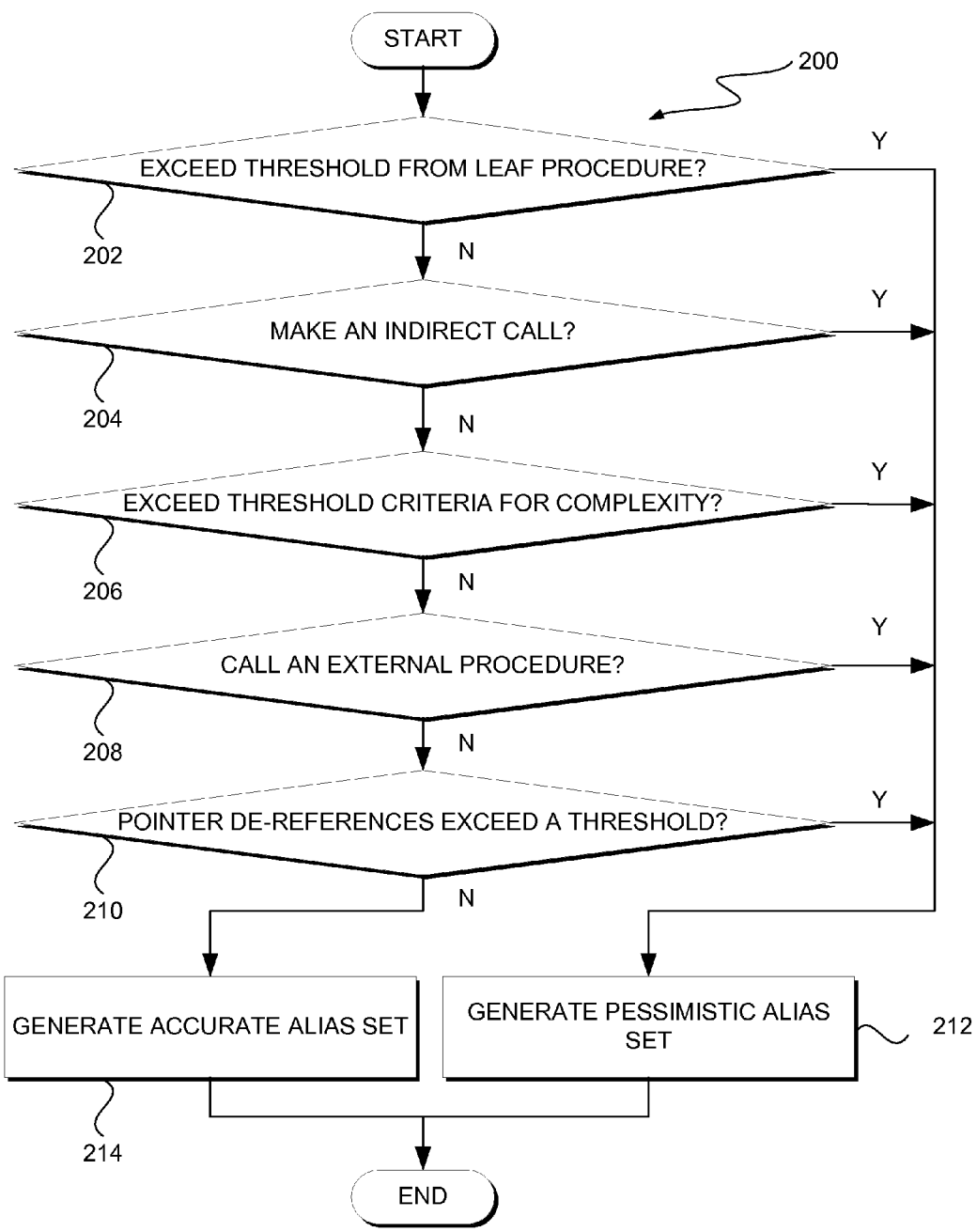
FIG. 2 illustrates a first example of operational processes for deciding whether to generate a pessimistic or an accurate alias set, on a computing device within the environment of FIG. 1, in accordance with an exemplary embodiment of the present invention.

FIG. 2 illustrates a first example of operational processes, generally designated 200, for deciding whether to generate a pessimistic or an accurate alias set, on computing device 102 within the environment of FIG. 1, in accordance with an exemplary embodiment of the present invention.

In decision step 202, heuristic program 104 determines, via the construction of a call graph substantially similar to the call graph described above, whether a procedure in program 106 exceeds a threshold number of calls away from a leaf procedure. A leaf procedure, as used herein, refers to a procedure that does not call any other procedures. In one embodiment, the threshold number of calls is a number of calls that an administrator or user sets. In another embodiment, there is a recommended threshold number of calls based on a statistical analysis of past results with other programs comparable to program 106. In other embodiments, the threshold number of calls reflects the amount of computation that can be tolerated by a compiler. In various embodiments, a call graph is created by heuristic program 104 in order to determine how many calls away a procedure is from a leaf procedure. Thus, if the threshold number of calls away from a leaf procedure is determined to be two or greater, then a procedure, represented by a vertex or node in the call graph, cannot require two or more edges to reach any leaf procedure.

If heuristic program 104 determines that the procedure exceeds the threshold number of calls away from a leaf procedure, then heuristic program 104 dictates that a pessimistic alias set should be generated for that procedure (step 212) using pessimistic aliasing program 108. If heuristic program 104 determines that the procedure does not exceed the threshold number of calls away from a leaf procedure, then heuristic program 104 proceeds to decision step 204.

In decision step 204, heuristic program 104 determines whether a procedure less than a threshold number of calls away from a leaf procedure makes one or more indirect calls to other procedures, or can reach other procedures that make indirect calls. As used herein, an indirect call refers to a call using a function pointer. A function pointer points to executable code within memory instead of referring to data values. When dereferenced, a function pointer can be used to invoke the function it points to and pass it arguments just like a typical function call. If a procedure makes an indirect call, then the target of the call is unknown and, hence, the outcome of generating an accurate alias set is also unknown.

If heuristic program 104 determines that the procedure makes one or more indirect calls to other procedures or calls one or more procedures that make indirect calls, then heuristic program 104 dictates that a pessimistic alias set should be generated for that procedure (step 212) using pessimistic aliasing program 108. If heuristic program 104 determines that the procedure does not make one or more indirect calls to other procedures, then heuristic program 104 proceeds to decision step 206.

In step 206, heuristic program 104 determines whether a procedure, which has passed decision steps 202 and 204, exceeds a threshold criterion for complexity. In various embodiments, a threshold criterion for complexity includes one or more of: 1) the procedure exceeds a threshold value for size (e.g., lines of code, etc.); 2) the procedure exceeds a threshold number of calls to other procedures; and 3) the procedure has difficult-to-analyze constructs (e.g., inline assembler code, etc.).

If heuristic program 104 determines that the procedure exceeds a threshold criterion for complexity, then heuristic program 104 dictates that a pessimistic alias set should be generated for that procedure (step 212) using pessimistic aliasing program 108. If heuristic program 104 determines that the procedure does not exceed a threshold criterion for complexity, then heuristic program 104 proceeds to decision step 208.

In step 208, heuristic program 104 determines whether a procedure, which has passed decision steps 202-206, calls an external procedure or can reach another procedure in the call graph that calls an external procedure. If a procedure (or another procedure that the procedure can reach) makes a call to an external procedure, then the target of the call is unknown and, hence, the outcome of generating an accurate alias set is also unknown.

If heuristic program 104 determines that the procedure makes a call to an external procedure or can reach another procedure in the call graph that calls an external procedure, then heuristic program 104 dictates that a pessimistic alias set should be generated for that procedure (step 212) using pessimistic aliasing program 108. If heuristic program 104 determines that the procedure does not make a call to an external procedure or cannot reach another procedure in the call graph that calls an external procedure, then heuristic program 104 proceeds to decision step 210.

In step 210, heuristic program 104 determines whether a procedure, which has passed decision steps 202-208, exceeds a threshold number for making too many pointer de-references or calls other procedures that exceed a threshold number for making too many pointer de-references. Procedures that make pointer de-references kill variables that have had their addresses taken.

If heuristic program 104 determines that the procedure exceeds a threshold number for making too many pointer de-references or calls other procedures that exceed a threshold number for making too many pointer de-references, then heuristic program 104 dictates that a pessimistic alias set should be generated for that procedure (step 212) using pessimistic aliasing program 108. If heuristic program 104 determines that the procedure does not exceed a threshold number for making too many pointer de-references or call other procedures that exceed a threshold number for making too many pointer de-references, then heuristic program 104 proceeds to step 214.

In the embodiment shown in FIG. 2, the procedures that pass the criteria for decision steps 202-214 (i.e., the answer="N") are determined to be worthwhile for the generation of an accurate alias set by accurate aliasing program 110 (step 214).

It should be understood that the processes detailed in FIG. 2 are just one embodiment for heuristic program 104. Many other embodiments are possible. For example, steps 202-210 are executed in any order that enables a satisfactory aliasing strategy for a program in various embodiments. In other embodiments, one or more steps in FIG. 2 are skipped (i.e., not performed) by heuristic program 104 to still provide a satisfactory aliasing strategy for certain programs. In yet other embodiments, heuristic program 104 is set to allow one or more steps in FIG. 2 to fail and still determine that the generation of an accurate alias set by accurate aliasing program 110 is worthwhile.

Figure 3:
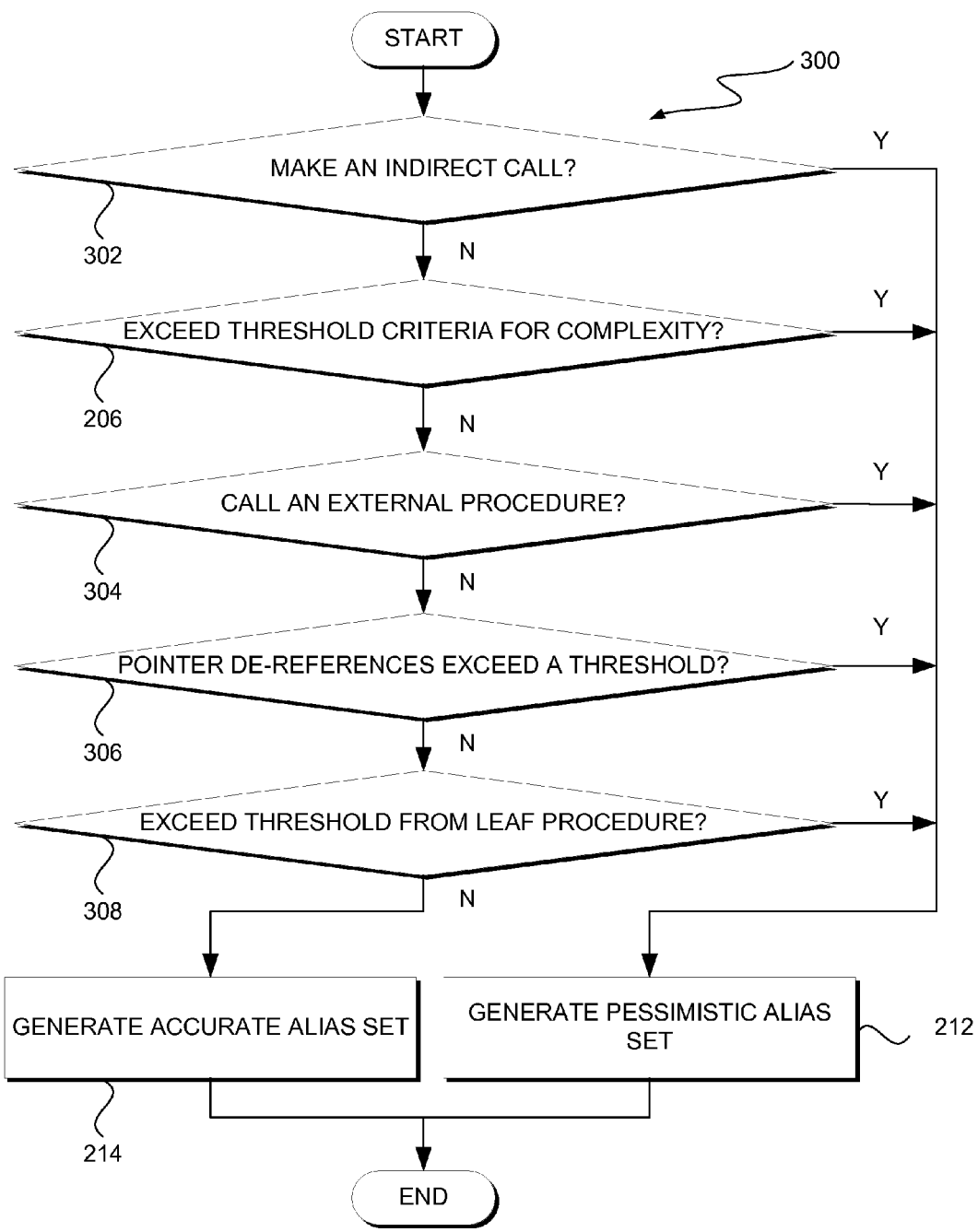
FIG. 3 illustrates a second example of operational processes for deciding whether to generate a pessimistic or an accurate alias set, on a computing device within the environment of FIG. 1, in accordance with an exemplary embodiment of the present invention.

FIG. 3 illustrates a second example of operational processes, generally designated 300, for deciding whether to generate a pessimistic or an accurate alias set, on computing device 102 within the environment of FIG. 1, in accordance with an exemplary embodiment of the present invention.

FIG. 3 depicts an exemplary embodiment in which a first pass analysis is done by heuristic program 104 in steps 302, 206, 304, and 306 using substantially similar criteria as described in steps 204-210 (FIG. 2). Any procedures within program 106 that are determined to require pessimistic aliasing by heuristic program 104 are flagged in the first pass analysis. In this embodiment, a second pass analysis is then initiated by heuristic program 104 whereby any procedures not flagged in the first pass analysis are analyzed via a call graph using an analysis substantially similar to the step 202 analysis in FIG. 2. In this exemplary embodiment, a procedure is flagged by heuristic program 104 as requiring pessimistic aliasing in the second pass analysis if: 1) the procedure fails the threshold criterion described in step 202; or 2) the procedure encounters a node representing another procedure, which has been flagged as requiring pessimistic aliasing in steps 302, 206, 304, and 306.

Using the embodiment depicted in FIG. 3 results in less computation for steps 302, 304, 306, and 308 as compared respectively to steps 204, 208, 210, and 202 in FIG. 2. For example, heuristic program 104 determines in step 302 whether a procedure makes one or more indirect calls to other procedures, but it does not require the determination of whether that procedure can reach other procedures that make indirect calls like in step 204 in FIG. 2. This is because unlike step 202 in FIG. 2, step 308 in FIG. 3 has the additional criterion whereby it determines a procedure should undergo pessimistic aliasing if it encounters a node representing another procedure, which has been flagged as requiring pessimistic aliasing in steps 302, 206, 304, and 306 in FIG. 3. Step 202 in the embodiment shown in FIG. 2 cannot encounter procedures flagged by the other steps because those steps have not been allowed to flag procedures before step 202 is executed.

Likewise and for the same reason, heuristic program 104 determines in step 304 whether a procedure calls an external procedure, but it does not require the determination of whether that procedure can reach other procedures that can call an external procedure like in step 208 in FIG. 2.

Also likewise and again for the same reason, heuristic program 104 determines in step 306 whether a procedure exceeds a threshold number for making too many pointer de-references, but it does not require the determination of whether that procedure can reach other procedures that exceed a threshold number for making too many pointer de-references like in step 210 in FIG. 2.

It should be understood that the use of a call graph in steps 202 and 308 does not require the computation of a reachability relationship in the graph. Instead, a shallow search of the call graph starting at the vertex represented by the procedure in question is sufficient for most cases. Thus, a shallow search includes searching from the vertex in question until either the threshold condition is violated or all possible vertices within the distance of the threshold have been searched.

Figure 4:
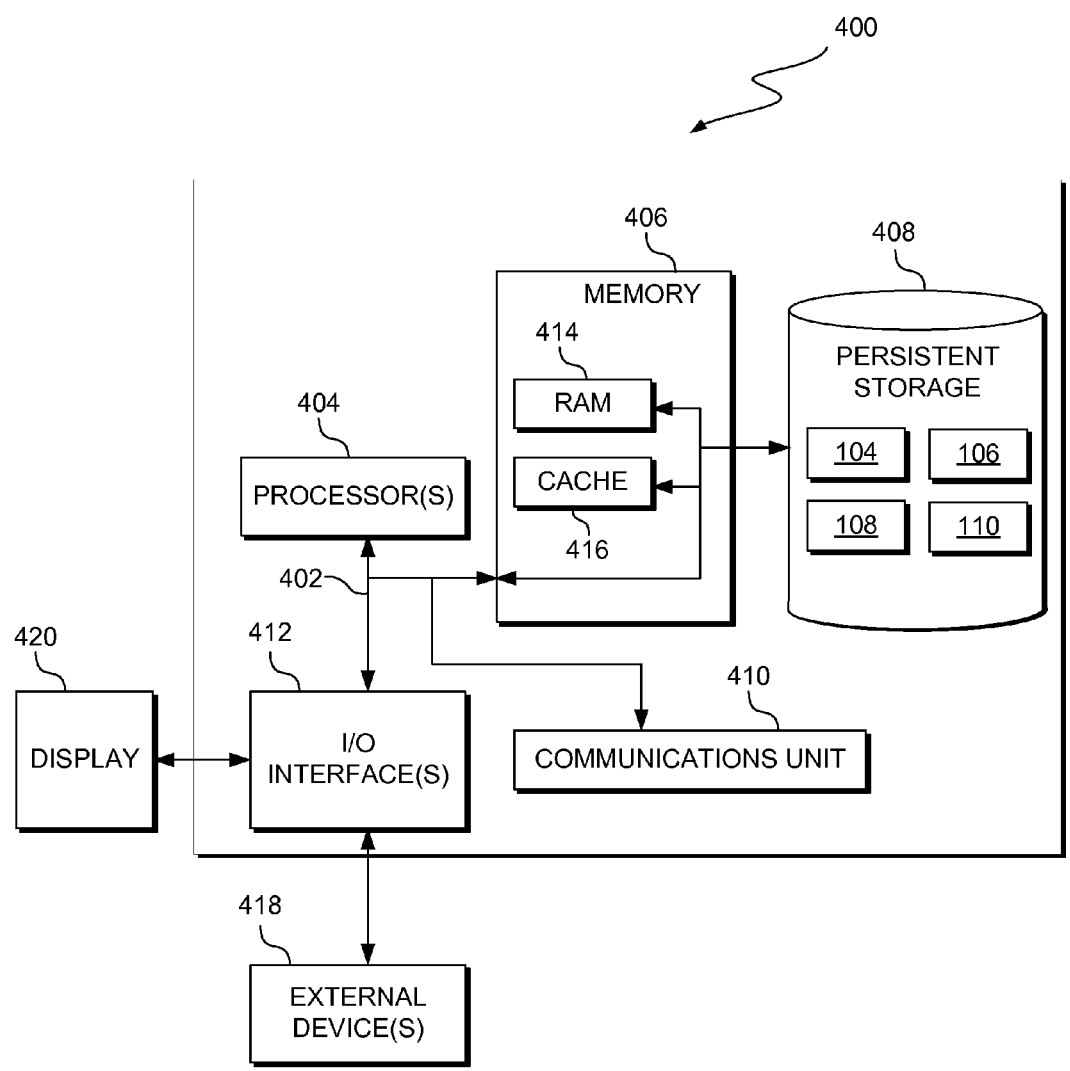
FIG. 4 depicts a block diagram of components of the computing device executing a heuristic program, in accordance with an exemplary embodiment of the present invention.

FIG. 3 depicts a block diagram, 400, of components of computing device 102, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Computing device 102 includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 414 and cache memory 416. In general, memory 406 can include any suitable volatile or non-volatile computer-readable storage media.

Heuristic program 104, program 106, pessimistic aliasing program 108, and accurate aliasing program 110 are stored in persistent storage 408 for execution and/or access by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 410, in these examples, provides for communications with other data processing systems or devices, including resources of network 130. In these examples, communications unit 410 includes one or more network interface cards. Communications unit 410 may provide communications through the use of either or both physical and wireless communications links. Heuristic program 104, program 106, pessimistic aliasing program 108, and accurate aliasing program 110 may be downloaded to persistent storage 408 through communications unit 410.

I/O interface(s) 412 allows for input and output of data with other devices that may be connected to computing device 102. For example, I/O interface 412 may provide a connection to external devices 418 such as a keyboard, keypad, a touch screen, and/or some other suitable input device. External devices 418 can also include portable computer-readable storage media such as, for example, thumb drives, portable optical or magnetic disks, and memory cards. Software and data used to practice embodiments of the present invention, e.g., heuristic program 104, program 106, pessimistic aliasing program 108, and accurate aliasing program 110, can be stored on such portable computer-readable storage media and can be loaded onto persistent storage 408 via I/O interface(s) 412. I/O interface(s) 412 also connect to a display 420.

Display 420 provides a mechanism to display data to a user and may be, for example, a computer monitor, or a television screen.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

It is to be noted that the term(s) such as "Smalltalk," "Java," and the like may be subject to trademark rights in various jurisdictions throughout the world and are used here only in reference to the products or services properly denominated by the marks to the extent that such trademark rights may exist.

What is claimed is:

1. A computer program product comprising:
one or more computer-readable storage media and program instructions stored on at least one of the one or more computer-readable storage media, the program instructions comprising:
program instructions to determine whether a first procedure within a first program has access to one or more variables declared outside the scope of the first procedure;
program instructions to generate a call graph computation that includes searching from a vertex representing the first procedure until one or more of a plurality of criteria that are configured for pessimistic aliasing cause the first procedure to be flagged;
program instructions to determine whether the first procedure within the first program meets a first criterion, wherein the first criterion is included in the plurality of criteria; and
responsive to the determination, program instructions to determine whether to flag the first procedure for pessimistic aliasing.

2. The computer program product of claim 1, wherein the plurality of criteria include one or more of: 1) the first program exceeds a threshold number of calls from a second procedure on a call graph, wherein the second procedure does not call any other procedure, 2) the first program is capable of a call to a pointer function, 3) the first program is capable of a call to a second procedure, wherein the second procedure is capable of a call to a pointer function; 4) the first program is beyond a threshold criterion of complexity, 5) the first program is capable of a call to an external variable, 6) the first program is capable of a call to a second procedure, wherein the second procedure is capable of making a call to an external variable, 7) the first program is capable of exceeding a threshold number for making pointer de-references, 8) the first program is capable of a call to a second procedure, wherein the second procedure exceeds a threshold number for making pointer de-references, 9) the first program is capable of a call to a second procedure, wherein the second procedure is flagged as requiring a pessimistic alias set.

3. The computer program product of claim 2, wherein the threshold number of calls between the first procedure and the second procedure on the call graph is one or more of: 1) a number of calls set by a user, 2) based, at least in part, on a statistical analysis of historical data from one or more second programs substantially similar to the first program, 3) based, at least in part, on an amount of computation that can be tolerated by a compiler, and 4) two.

4. The computer program product of claim 2, wherein the threshold criterion of complexity includes one or more of: 1) the first procedure exceeds a threshold value for size, 2) the first procedure exceeds making a threshold number of calls to other procedures, and 3) the first procedure has one or more difficult-to-analyze constructs.

5. The computer program product of claim 1, wherein the program includes one or more of: 1) COBOL, 2) PL/I, 3) C programming language, 4) methods in object-oriented languages, and 5) 'C' functions that can access file scope variables.

6. A computer system comprising:
one or more computer processors;
one or more computer-readable storage media; and
program instructions stored on at least one of the one or more computer-readable storage media for execution by at least one of the one or more processors, the program instructions comprising:
program instructions to determine whether a first procedure within a first program has access to one or more variables declared outside the scope of the first procedure;
program instructions to generate a call graph computation that includes searching from a vertex representing the first procedure until one or more of a plurality of criteria that are configured for pessimistic aliasing cause the first procedure to be flagged;
program instructions to determine whether the first procedure within the first program meets a first criterion, wherein the first criterion is included in the plurality of criteria; and
responsive to the determination, program instructions to determine whether to flag the first procedure for pessimistic aliasing.

7. The computer system of claim 6, wherein the plurality of criteria include one or more of: 1) the first program exceeds a threshold number of calls from a second procedure on a call graph, wherein the second procedure does not call any other procedure, 2) the first program is capable of a call to a pointer function, 3) the first program is capable of a call to a second procedure, wherein the second procedure is capable of a call to a pointer function; 4) the first program is beyond a threshold criterion of complexity, 5) the first program is capable of a call to an external variable, 6) the first program is capable of a call to a second procedure, wherein the second procedure is capable of making a call to an external variable, 7) the first program is capable of exceeding a threshold number for making pointer de-references, 8) the first program is capable of a call to a second procedure, wherein the second procedure exceeds a threshold number for making pointer de-references, 9) the first program is capable of a call to a second procedure, wherein the second procedure is flagged as requiring a pessimistic alias set.

8. The computer system of claim 7, wherein the threshold number of calls between the first procedure and the second procedure on the call graph is one or more of: 1) a number of calls set by a user, 2) based, at least in part, on a statistical analysis of historical data from one or more second programs substantially similar to the first program, 3) based, at least in part, on an amount of computation that can be tolerated by a compiler, and 4) two.

9. The computer system of claim 7, wherein the threshold criterion of complexity includes one or more of: 1) the first procedure exceeds a threshold value for size, 2) the first procedure exceeds making a threshold number of calls to other procedures, and 3) the first procedure has one or more difficult-to-analyze constructs.

10. The computer system of claim 6, wherein the program includes one or more of: 1) COBOL, 2) PL/I, 3) C programming language, 4) methods in object-oriented languages, and 5) 'C' functions that can access file scope variables.

* * * * *